United States Patent
Tsubaki

(10) Patent No.: US 7,499,212 B2
(45) Date of Patent: Mar. 3, 2009

(54) OPTICAL AMPLIFIER

(75) Inventor: Kazunari Tsubaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/360,582

(22) Filed: Feb. 24, 2006

(65) Prior Publication Data

US 2007/0064306 A1 Mar. 22, 2007

(30) Foreign Application Priority Data

Sep. 21, 2005 (JP) ............................. 2005-273142

(51) Int. Cl.
*H04B 10/17* (2006.01)
(52) U.S. Cl. ................................................. 359/341.41
(58) Field of Classification Search ............. 359/341.41
See application file for complete search history.

(56) References Cited

U.S. PATENT DOCUMENTS

| | | | | |
|---|---|---|---|---|
| 5,633,750 | A * | 5/1997 | Nogiwa et al. | 359/341.41 |
| 6,025,947 | A * | 2/2000 | Sugaya et al. | 398/97 |
| 6,069,731 | A * | 5/2000 | Bayart | 359/341.41 |
| 6,359,727 | B1 * | 3/2002 | Nakazato | 359/337.4 |
| 6,483,630 | B2 * | 11/2002 | Kosaka | 359/337.11 |
| 6,535,330 | B1 * | 3/2003 | Lelic et al. | 359/337.13 |
| 6,631,026 | B2 * | 10/2003 | Kinoshita et al. | 359/341.33 |
| 6,636,346 | B2 * | 10/2003 | Akiyama | 359/341.33 |
| 6,671,084 | B2 * | 12/2003 | Kosaka | 359/341.41 |
| 2001/0033413 | A1 * | 10/2001 | Lelic et al. | 359/341.4 |
| 2002/0114066 | A1 * | 8/2002 | Nakaji | 359/341.41 |
| 2002/0131164 | A1 * | 9/2002 | Palese | 359/349 |
| 2003/0030894 | A1 * | 2/2003 | Stentz | 359/341.41 |
| 2003/0147127 | A1 * | 8/2003 | Duling et al. | 359/341.41 |
| 2004/0021932 | A1 * | 2/2004 | Maurer et al. | 359/341.41 |
| 2004/0066551 | A1 * | 4/2004 | Lelic et al. | 359/341.41 |
| 2004/0240044 | A1 * | 12/2004 | Park et al. | 359/341.41 |
| 2005/0168806 | A1 * | 8/2005 | Maeda et al. | 359/341.4 |

FOREIGN PATENT DOCUMENTS

JP 9-244080 9/1997

* cited by examiner

*Primary Examiner*—Jack W Keith
*Assistant Examiner*—Ari M Diacou
(74) *Attorney, Agent, or Firm*—Staas & Halsey LLP

(57) ABSTRACT

An optical amplifier is disclosed that includes an input monitoring part configured to monitor an input wavelength division multiplexed light; an amplification part configured to amplify and output the input wavelength division multiplexed light; an output monitoring part configured to monitor the wavelength division multiplexed light output from the amplification part; a gain control part configured to perform gain control so that the ratio of output light intensity monitored by the output monitoring part to input light intensity monitored by the input monitoring part is constant; and a response speed switching part configured to switch the response speed of the gain control.

7 Claims, 7 Drawing Sheets

OPTICAL AMPLIFIER

BACKGROUND OF THE INVENTION

1. Field of the Invention

The present invention relates generally to optical amplifiers, and more particularly to an optical amplifier that automatically compensates for wavelength dispersion caused in a WDM (Wavelength Division Multiplexing) system.

2. Description of the Related Art

An optical amplifier employed in a WDM system is required to amplify multiple signals at a time. Further, an ADM (Add/Drop Multiplexer) capable of extracting and inserting individual signal lights independently has been put to practical use. A change in the number of signal wavelengths in the ADM causes a change in signal light power transmitted through an optical fiber.

Even when the number of signal wavelengths is changed, the output power of each signal wavelength can be expected to be constant by controlling an amplifier gain to a constant level. This control method is called AGC (Automatic Gain Control). It is required to increase the response speed of the AGC control of an optical amplifier as the speed of increasing and decreasing the number of wavelengths in the ADM increases.

FIG. 1 is a block diagram showing a conventional optical amplifier. Referring to FIG. 1, a part of input light from an optical fiber 10 is extracted at a light branch part 11 to be fed to a photodiode 13 of an input monitoring part 12, where photoelectric conversion is performed thereon. An input light intensity detection signal output from the photodiode 13 is amplified in a monitoring circuit 14 to be fed to a gain control circuit 16 in a gain control part 15.

Likewise, a part of the output light of an optical fiber 20 is extracted at a light branch part 21 to be fed to a photodiode 23 of an output monitoring part 22, where photoelectric conversion is performed thereon. An output light intensity detection signal output from the photodiode 23 is amplified in a monitoring circuit 24 to be fed to the gain control circuit 16 in the gain control part 15.

The gain control circuit 16 generates a control signal so that the ratio of the input light intensity detection signal to the output light intensity detection signal is constant, and feeds the generated control signal to a laser diode 17. The laser diode 17 outputs pump light having intensity corresponding to the control signal. The pump light is fed through a light composition part 18 to an EDFA (Erbium Doped Fiber Amplifier) 26 forming an amplification part 25, in which the input light is amplified.

Japanese Laid-Open Patent Application No. 9-244080 discloses the technique of monitoring the number of input channels from input light power, controlling a pump light source so that output light power is constant, and making the output light power of each channel constant by switching, in accordance with a change in the number of input channels, set values for controlling the output light power to a constant level.

In order to support a fast increase and decrease in the number of wavelengths, it is necessary to minimize gain variation even if the number of wavelengths changes by causing light monitoring or AGC control to be performed at high speed. In general, the speed of increasing and decreasing the number of wavelengths varies from a few to several hundred microseconds ($\mu s$). Therefore, it is necessary to set the response speed of AGC control also to a few to several hundred $\mu s$. Further, in the future, the speed of optical switching is expected to increase, so that the speed of increasing and decreasing the number of wavelengths and the response speed may be less than 1 $\mu s$.

On the other hand, in the case of operating a small number of wavelengths and transmitting a low-speed signal, the light average power to be monitored may vary because of the signal pattern effect. In SONET (Synchronous Optical Network) or SDH (Synchronous Digital Hierarchy), a 72-bit sequence of consecutive identical digits is caused as a result of scrambling. For example, according to ITU-T G.957, 72 bits of identical digits are recommended as a test pattern for identical digit immunity. For example, if a 72-bit consecutive identical digit pattern is employed for a 155 Mbps signal, the length (time) of the identical digits is approximately 0.46 $\mu s$, which is long enough for responding if the response speed of AGC control is a few $\mu s$.

Further, even if the input of an optical amplifier is a signal component by 100%, the variation component due to signal pattern is not always the same in the input part and the output part because the output of the optical amplifier includes an ASE (Amplified Spontaneous Emission) component. For example, if 72 bits of consecutive 1s appear in a signal of a mark ratio of 50%, the monitoring result of an input signal is as indicated by the solid line in FIG. 2, and the monitoring result of an output signal at this point is expected to be as indicated by the solid line in FIG. 3. In FIG. 3, a signal component is superposed on an ASE component.

Referring to FIGS. 2 and 3, the ratio of the output y1 of the monitoring circuit 24 to the output x1 of the monitoring circuit 14 in the signal of a mark ratio of 50% is (y1/x1), while the ratio of the output y2 of the monitoring circuit 24 to the output x2 of the monitoring circuit 14 in the signal of a mark ratio of 100% is (y2/x2), which is less than (y1/x1) [(y1/x1) >(y2/x2)].

However, gain control causes the gain of the monitoring results of the input and output to be constant. That is, the gain control part 15 performs AGC control so that the ratio of the output of the monitoring circuit 24 to the output of the monitoring circuit 14 is constant at (y1/x1). Accordingly, the actually obtained monitoring result of the output is as indicated by the solid line in FIG. 4. In FIG. 4, the ratio of the output z2 of the monitoring circuit 24 to the output z1 of the monitoring circuit 14 in the signal of a mark ratio of 100% is (z2/x2), which is equal to (y1/x1) [(z2/x2)=(y1/x1)]. This causes a problem in that the ASE component increases in the part of the signal of a mark ratio of 100%, thus causing a variation in signal gain.

SUMMARY OF THE INVENTION

Accordingly, it is a general object of the present invention to provide an optical amplifier in which the above-described disadvantages are eliminated.

A more specific object of the present invention is to provide an optical amplifier capable of both a high-speed response to an increase and decrease in the number of wavelengths and a stable amplification operation at the time of operating a low-speed signal with a small number of wavelengths.

The above objects of the present invention are achieved by an optical amplifier including an input monitoring part configured to monitor an input wavelength division multiplexed light; an amplification part configured to amplify and output the input wavelength division multiplexed light; an output monitoring part configured to monitor the wavelength division multiplexed light output from the amplification part; a gain control part configured to perform gain control so that a ratio of output light intensity monitored by the output monitoring part to input light intensity monitored by the input monitoring part is constant; and a response speed switching part configured to switch a response speed of the gain control.

According to one embodiment of the present invention, it is possible to realize both a high-speed response to an increase and decrease in the number of wavelengths and a stable amplification operation at the time of operating a low-speed signal with a small number of wavelengths.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

An optical amplifier employed in a WDM system is provided with monitoring information from an upper-level monitoring system. The number of wavelengths and the rate information (bit rate) of a signal of each wavelength are added in advance to the monitoring information, and conditions for switching response speed are preset in the optical amplifier.

First Embodiment

Figure 5:
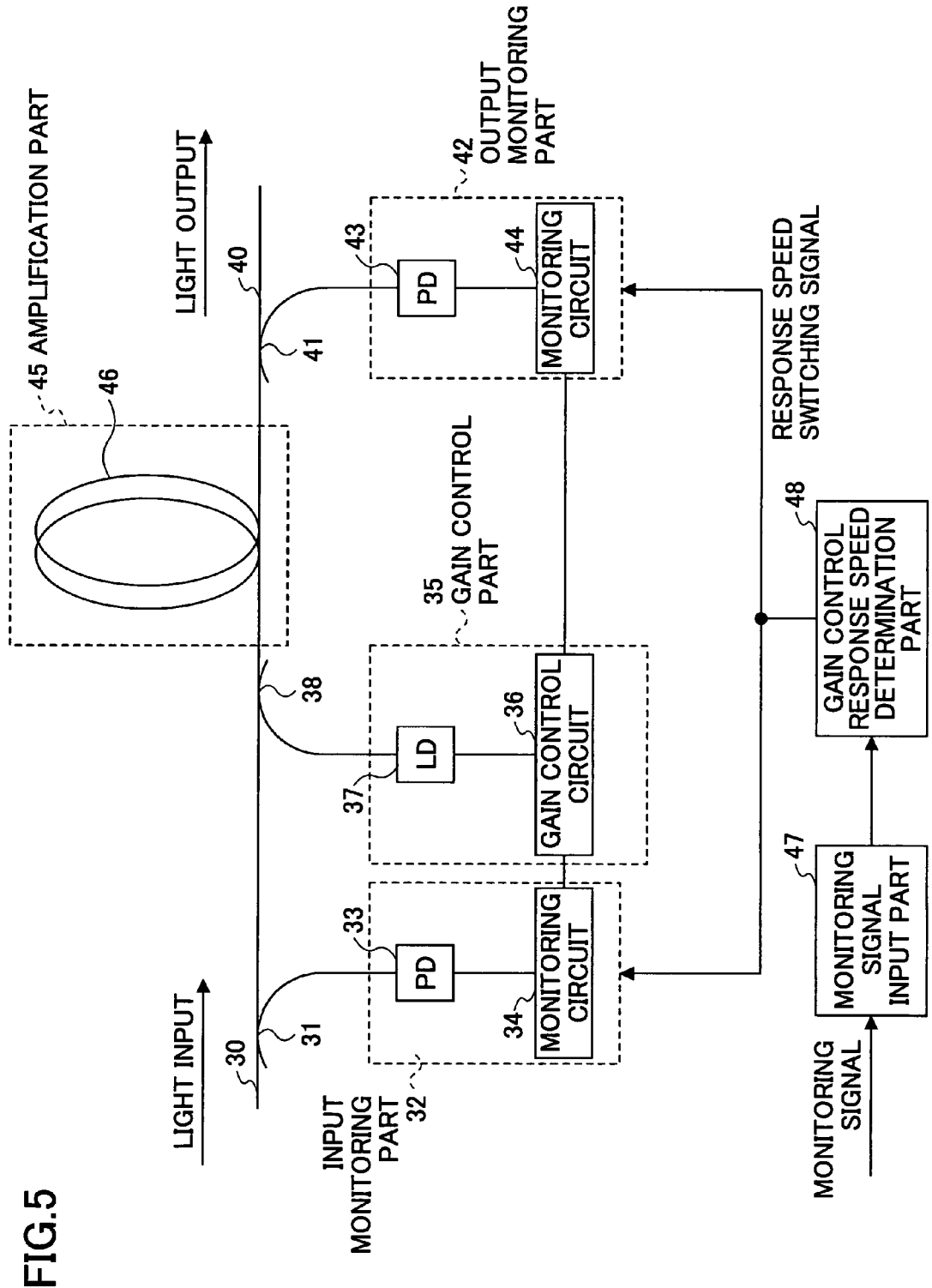
FIG. 5 is a block diagram showing an optical amplifier according to a first embodiment of the present invention.

FIG. 5 is a block diagram showing an optical amplifier according to a first embodiment of the present invention. Referring to FIG. 5, a part of input light from an optical fiber 30 is extracted at a light branch part 31 to be fed to a photodiode 33 of an input monitoring part 32, where photoelectric conversion is performed thereon. An input light intensity detection signal output from the photodiode 33 is amplified in a monitoring circuit 34 to be fed to a gain control circuit 36 in a gain control part 35.

Likewise, a part of the output light of an optical fiber 40 is extracted at a light branch part 41 to be fed to a photodiode 43 of an output monitoring part 42, where photoelectric conversion is performed thereon. An output light intensity detection signal output from the photodiode 43 is amplified in a monitoring circuit 44 to be fed to the gain control circuit 36 in the gain control part 35.

The gain control circuit 36 generates a control signal to control the ratio (K) of the output light intensity detection signal to the input light intensity detection signal to a constant value from the difference between a signal obtained by amplifying the input light intensity detection signal with a predetermined gain (K) and the output light intensity detection signal. The gain control circuit 36 feeds the generated control signal to a laser diode 37. The laser diode 37 outputs pump light having intensity corresponding to the control signal. The pump light is fed through a light composition part 38 to an EDFA 46 forming an amplification part 45, in which the input light is amplified.

A monitoring signal input part 47 is notified of the number of wavelengths of the input light and the rate information of a signal of each wavelength by a monitoring signal fed from a monitoring system. The monitoring signal input part 47 feeds the number of wavelengths and the rate information of the signal of each wavelength to a gain control response speed determination part 48.

If the number of wavelengths is greater than or equal to two and the maximum value of the signal rates of all the wavelengths is less than or equal to 155 Mbps, the gain control response speed determination part 48 feeds a response speed switching signal to the input monitoring part 32 and the output monitoring part 42 as value 1. On the other hand, if the number of wavelengths is less than two or the maximum value of the signal rates of all the wavelengths exceeds 155 Mbps, the gain control response speed determination part 48 feeds the response speed switching signal to the input monitoring part 32 and the output monitoring part 42 as value 0.

The monitoring circuit 34 of the input monitoring part 32 and the monitoring circuit 44 of the output monitoring part 42 usually perform a high-speed operation with a response speed of a few μs or less. When the monitoring circuits 34 and 44 are fed with the response speed switching signal of value 1, the monitoring circuits 34 and 44 switch the response speed to tens of μs or more and perform a low-speed operation. The gain control part 35 performs a high-speed operation with a response speed of a few μs or less. However, when the number of wavelengths is greater than or equal to two and the maximum value of the signal rates of all the wavelengths is less than or equal to 155 Mbps, the response speed of AGC control is tens of μs or more as a result of switching the response speeds by the monitoring circuits 34 and 44.

In the monitoring circuits 34 and 44, the response speed may be switched by providing and switching between a monitoring circuit for high-speed operation and a monitoring circuit for low-speed operation, or by switching the output of a monitoring circuit for high-speed operation between direct output and output through a low-pass filter.

Figure 1:
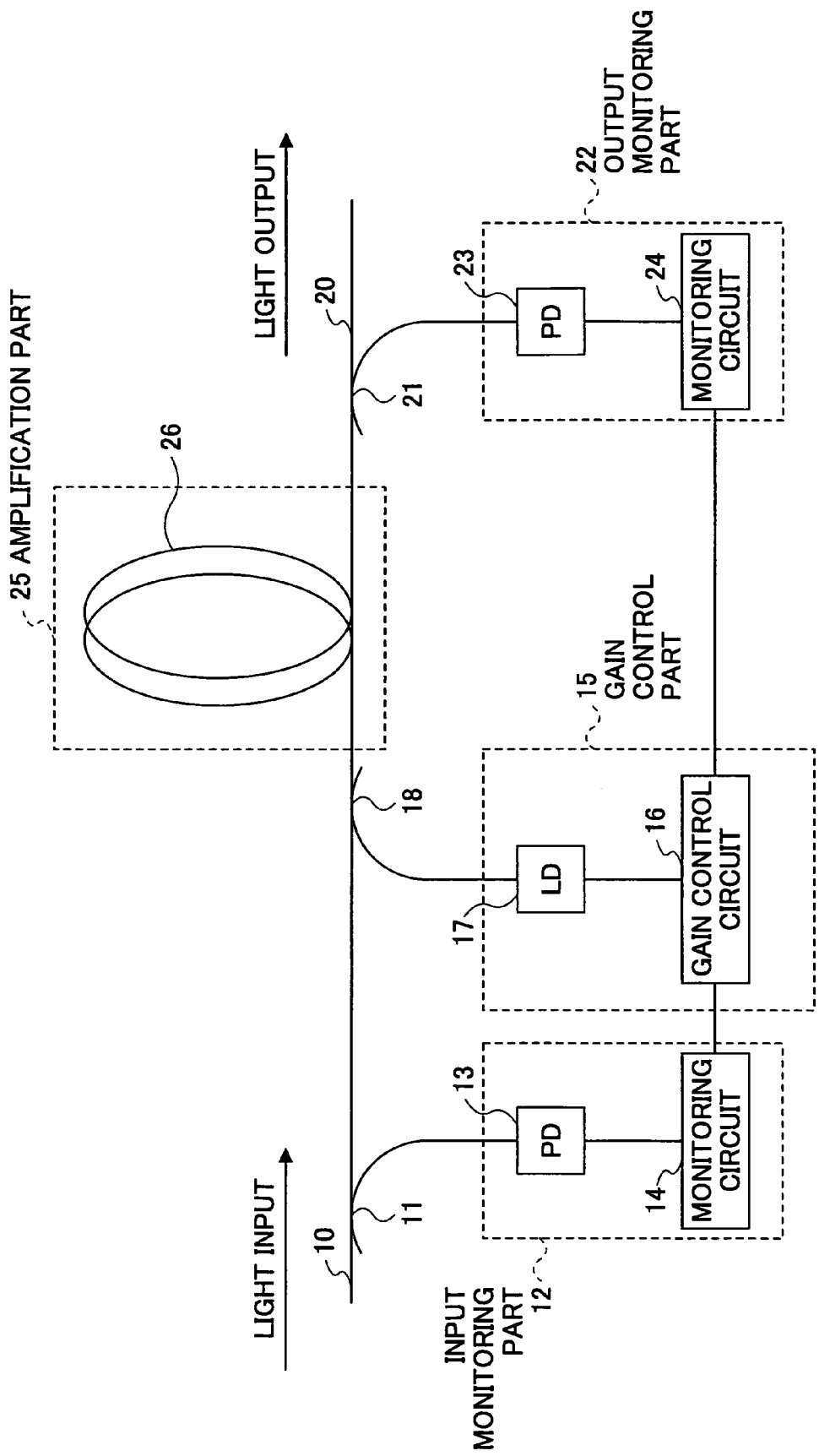
FIG. 1 is a block diagram showing a conventional optical amplifier.
Figure 2:
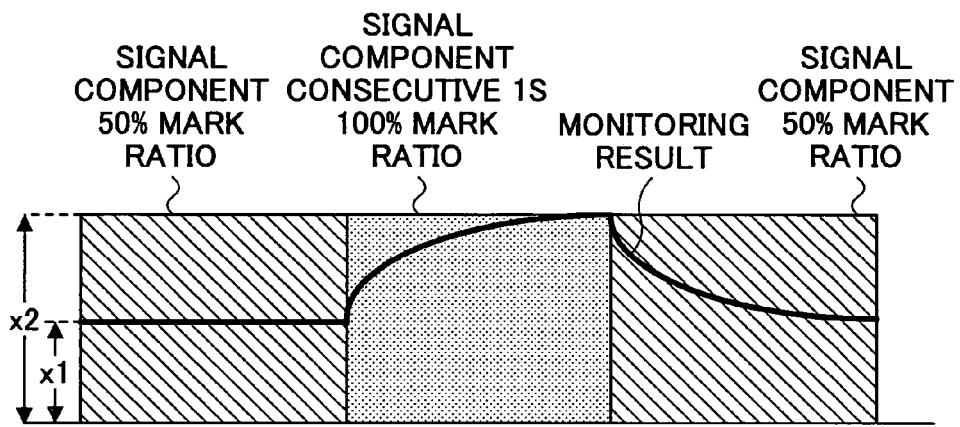
FIG. 2 is a graph showing the monitoring result of an input signal.
Figure 3:
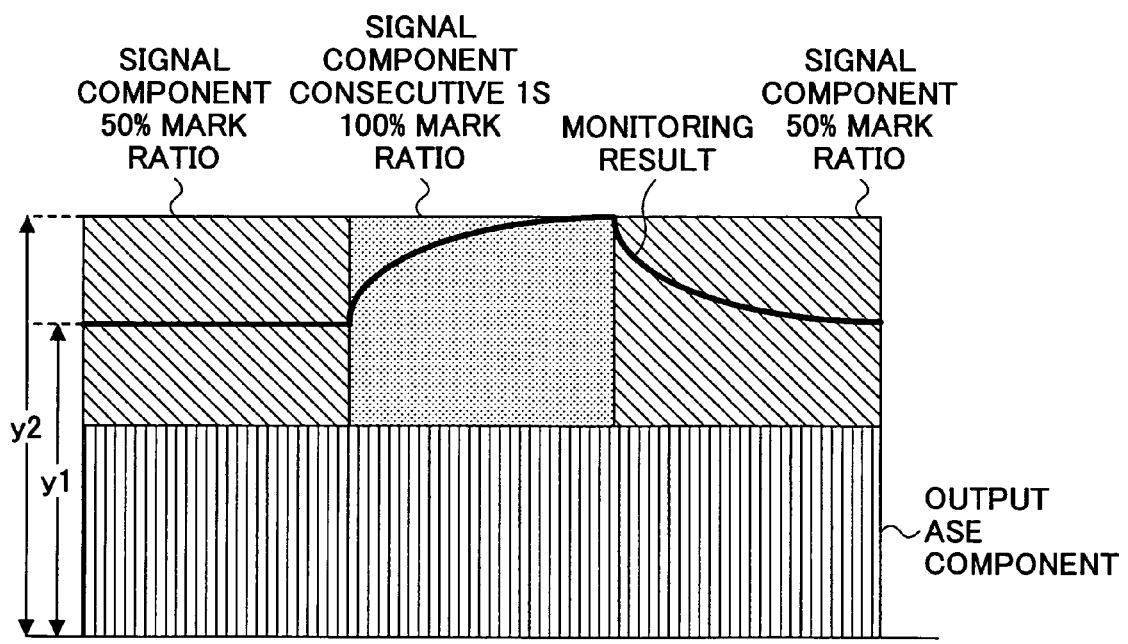
FIG. 3 is a graph showing the monitoring result of an output signal according to the present invention.
Figure 4:
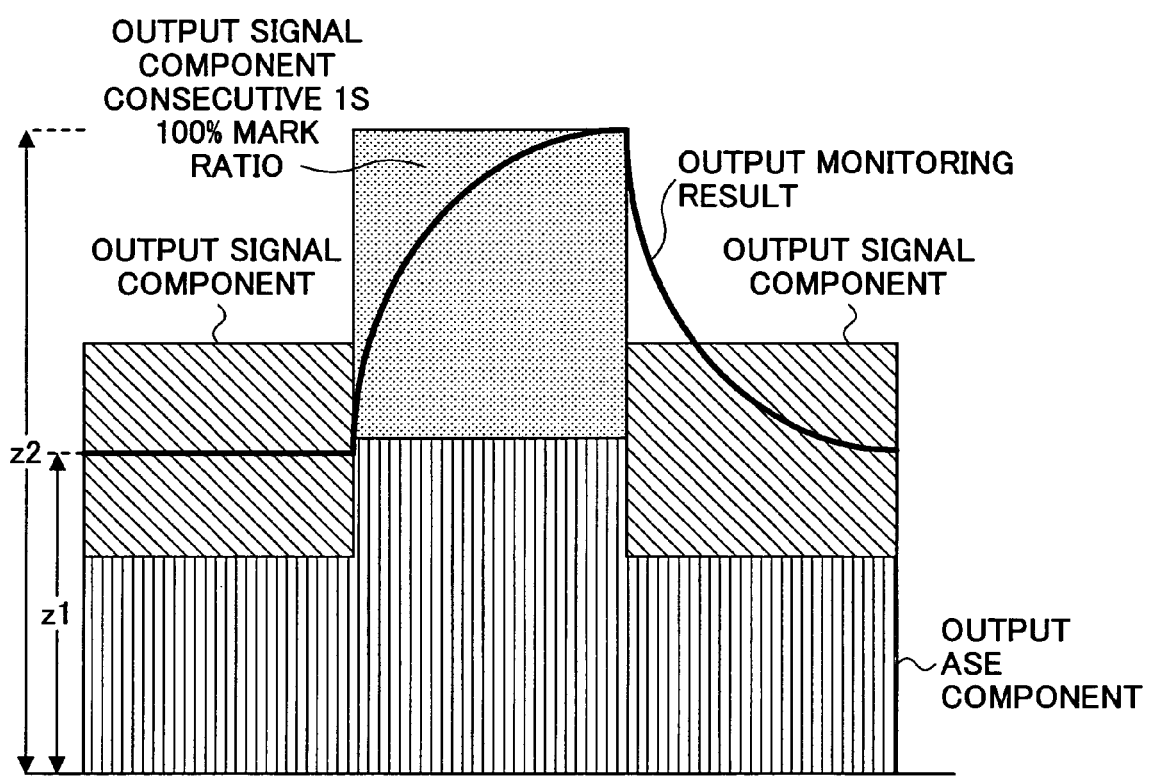
FIG. 4 is a graph showing the monitoring result of a conventional output signal.

As a result, for example, at the time of appearance of 72 bits of consecutive 1s in a signal of a mark ratio of 50%, the input light intensity detection signal output from the monitoring circuit 34 becomes flat at the same value as at the time of a mark ratio of 50% in FIG. 2 (x1), and the output light intensity detection signal output from the monitoring circuit 44 also becomes flat at the same value as at the time of a mark ratio of 50% in FIG. 3 (y1). Accordingly, in the output signal of the optical fiber 40, the ASE component in the part of the 72 bits of consecutive 1s has the same size as at the time of a mark ratio of 50% as shown in FIG. 3. As a result, the ASE component is prevented from increasing in the part of the 72 bits of consecutive 1s is as shown in FIG. 4, so that it is possible to prevent a variation in signal gain.

Figure 6:
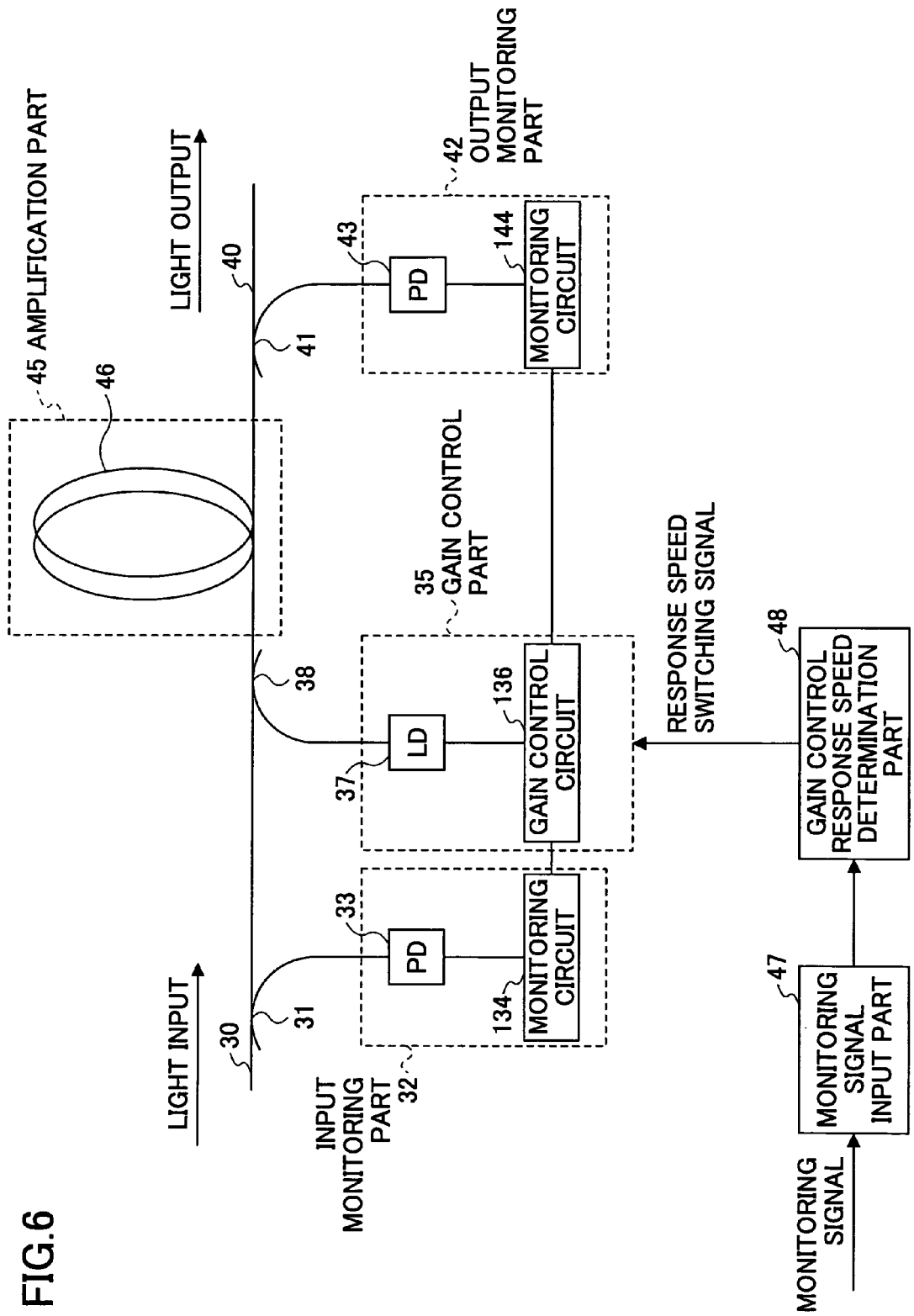
FIG. 6 is a block diagram showing an optical amplifier according to a second embodiment of the present invention.

The monitoring signal input part 47 is often added in order to relay a monitoring signal also in the conventional configuration. Further, the monitoring signal often uses signal wavelengths outside the amplification band of the optical amplifier. In this embodiment, however, the monitoring signal is not limited in its form. The monitoring signal may use a signal wavelength in the amplification band, and may also use an electrical/radio signal.

Second Embodiment FIG. 6 is a block diagram showing an optical amplifier according to a second embodiment of the present invention. Referring to FIG. 6, a part of input light from the optical fiber 30 is extracted at the light branch part 31 to be fed to the photodiode 33 of the input monitoring part 32, where photoelectric conversion is performed thereon. An input light intensity detection signal output from the photodiode 33 is amplified in a monitoring circuit 134 to be fed to a gain control circuit 136 in the gain control part 35.

Likewise, a part of the output light of the optical fiber 40 is extracted at the light branch part 41 to be fed to the photodiode 43 of the output monitoring part 42, where photoelectric conversion is performed thereon. An output light intensity detection signal output from the photodiode 43 is amplified in a monitoring circuit 144 to be fed to the gain control circuit 136 in the gain control part 35.

The gain control circuit 136 generates a control signal to control the ratio (K) of the output light intensity detection signal to the input light intensity detection signal to a constant value from the difference between a signal obtained by amplifying the input light intensity detection signal with a predetermined gain (K) and the output light intensity detection signal. The gain control circuit 136 feeds the generated control signal to the laser diode 37. The laser diode 37 outputs pump light having intensity corresponding to the control signal. The pump light is fed through the light composition part 38 to the EDFA 46 forming the amplification part 45, in which the input light is amplified.

The monitoring signal input part 47 is notified of the number of wavelengths of the input light and the rate information of a signal of each wavelength by a monitoring signal fed from a monitoring system. The monitoring signal input part 47 feeds the number of wavelengths and the rate information of a signal of each wavelength to the gain control response speed determination part 48.

If the number of wavelengths is greater than or equal to two and the maximum value of the signal rates of all the wavelengths is less than or equal to 155 Mbps, the gain control response speed determination part 48 feeds a response speed switching signal to the gain control circuit 136 as value 1. On the other hand, if the number of wavelengths is less than two or the maximum value of the signal rates of all the wavelengths exceeds 155 Mbps, the gain control response speed determination part 48 feeds the response speed switching signal to the gain control circuit 136 as value 0.

The gain control circuit 136 usually performs a high-speed operation with a response speed of a few μs or less. When the gain control circuit 136 is fed with the response speed switching signal of value 1, the gain control circuit 136 switches the response speed to tens of μs or more and performs a low-speed operation.

In the gain control circuit 136, the response speed may be switched by providing and switching between a gain control circuit for high-speed operation and a gain control circuit for low-speed operation, or by switching the output of a gain control circuit for high-speed operation between direct output and output through a low-pass filter.

As a result, for example, at the time of appearance of 72 bits of consecutive 1s in a signal of a mark ratio of 50%, the input light intensity detection signal output from the monitoring circuit 134 becomes flat at the same value as at the time of a mark ratio of 50% in FIG. 2 (x1), and the output light intensity detection signal output from the monitoring circuit 144 also becomes flat at the same value as at the time of a mark ratio of 50% in FIG. 3 (y1). Accordingly, in the output signal of the optical fiber 40, the ASE component in the part of 72 bits of consecutive 1s has the same size as at the time of a mark ratio of 50% as shown in FIG. 3. As a result, the ASE component is prevented from increasing in the part of 72 bits of consecutive 1s as shown in FIG. 4, so that it is possible to prevent a variation in signal gain.

Third Embodiment

Figure 7:
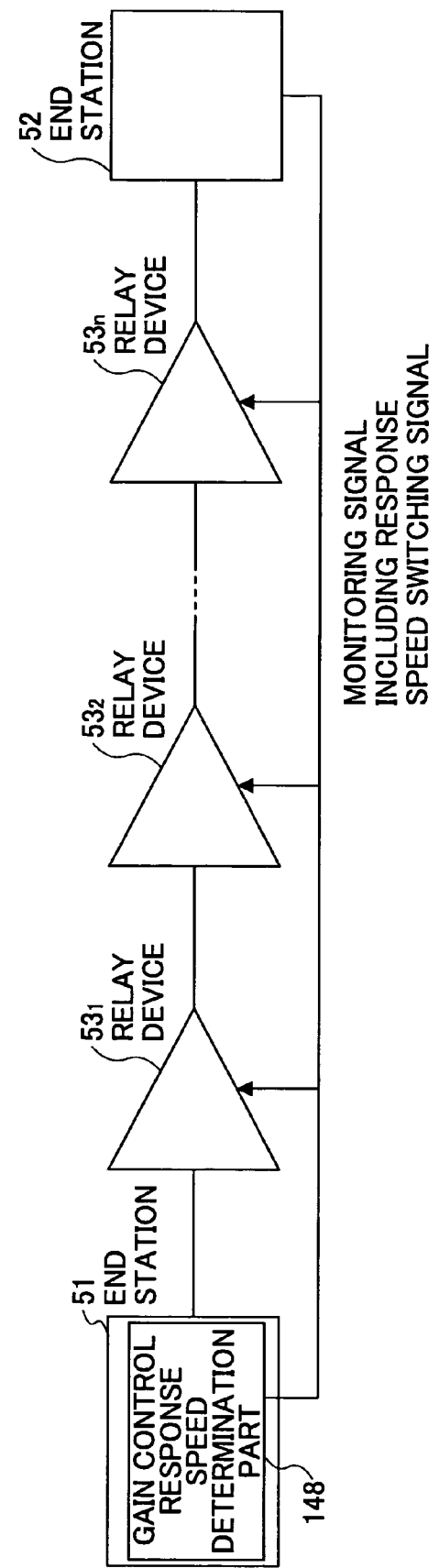
FIG. 7 is a diagram showing a WDM optical transmission system according to a third embodiment of the present invention.

In a WDM optical transmission system shown in FIG. 7, optical amplifiers $53_1$ through $53_n$ are connected as relay devices in the optical transmission line between an end station 51 and an end station 52. In this WDM optical transmission system, the number of wavelengths and the rate information of a signal of each wavelength do not change in the optical transmission line between the end station 51 and the end station 52.

Accordingly, a gain control response speed determination part 148 is provided in the end station 51, a response speed switching signal is generated based on determination as to whether the number of wavelengths is two or more and the maximum value of the signal rates of all the wavelengths is less than or equal to 155 Mbps, and the response speed switching signal is included in a monitoring signal to be fed to the optical amplifiers $53_1$ through $53_n$ and the end station 52. The response speed switching signal is a value of 1 if the number of wavelengths is two or more and the maximum value of the signal rates of all the wavelengths is less than or equal to 155 Mbps, and is a value of 0 if the number of wavelengths is less than two or the maximum value of the signal rates of all the wavelengths exceeds 155 Mbps.

Figure 8:
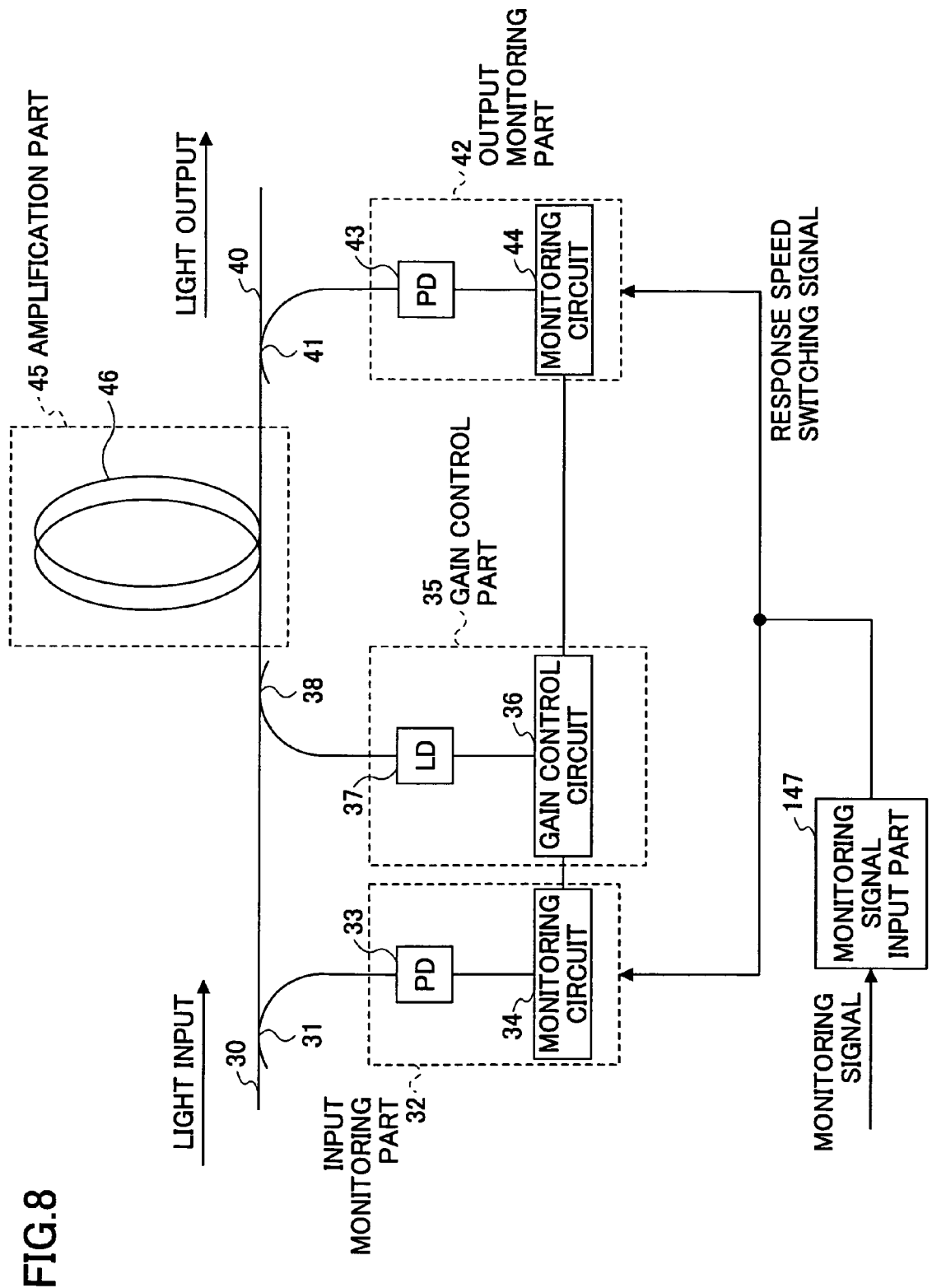
FIG. 8 is a block diagram showing an optical amplifier according to the third embodiment of the present invention.

FIG. 8 is a block diagram showing an optical amplifier according to a third embodiment of the present invention. Referring to FIG. 8, a part of input light from the optical fiber 30 is extracted at the light branch part 31 to be fed to the photodiode 33 of the input monitoring part 32, where photoelectric conversion is performed thereon. An input light intensity detection signal output from the photodiode 33 is amplified in the monitoring circuit 34 to be fed to the gain control circuit 36 in the gain control part 35.

Likewise, a part of the output light of the optical fiber 40 is extracted at the light branch part 41 to be fed to the photodiode 43 of the output monitoring part 42, where photoelectric conversion is performed thereon. An output light intensity detection signal output from the photodiode 43 is amplified in the monitoring circuit 44 to be fed to the gain control circuit 36 in the gain control part 35.

The gain control circuit 36 generates a control signal to control the ratio (K) of the output light intensity detection signal to the input light intensity detection signal to a constant value from the difference between a signal obtained by amplifying the input light intensity detection signal with a predetermined gain (K) and the output light intensity detection signal. The gain control circuit 36 feeds the generated control signal to the laser diode 37. The laser diode 37 outputs pump light having intensity corresponding to the control signal. The pump light is fed through the light composition part 38 to the EDFA 46 forming the amplification part 45, in which the input light is amplified.

A monitoring signal input part 147 extracts a response speed switching signal from a monitoring signal supplied from the end station 51, and feeds the extracted response speed switching signal to the input monitoring part 32 and the output monitoring part 42.

The input monitoring part 32 and the output monitoring part 42 usually perform a high-speed operation with a response speed of a few μs or less. When the input monitoring part 32 and the output monitoring part 42 are fed with the response speed switching signal of value 1, the input monitoring part 32 and the output monitoring part 42 switch the response speed to tens of μs or more and perform a low-speed operation. The gain control part 35 performs a high-speed operation with a response speed of a few μs or less. However, when the number of wavelengths is greater than or equal to two and the maximum value of the signal rates of all the wavelengths is less than or equal to 155 Mbps, the response speed of AGC control is tens of μs or more as a result of switching the response speeds by the input monitoring part 32 and the output monitoring part 42.

In the monitoring circuits 34 and 44, the response speed may be switched by providing and switching between a monitoring circuit for high-speed operation and a monitoring circuit for low-speed operation, or by switching the output of a monitoring circuit for high-speed operation between direct output and output through a low-pass filter.

As a result, for example, at the time of appearance of 72 bits of consecutive 1s in a signal of a mark ratio of 50%, the input light intensity detection signal output from the monitoring circuit 34 becomes flat at the same value as at the time of a mark ratio of 50% in FIG. 2 (x1), and the output light intensity detection signal output from the monitoring circuit 44 also becomes flat at the same value as at the time of a mark ratio of 50% in FIG. 3 (y1). Accordingly, in the output signal of the optical fiber 40, the ASE component in the part of 72 bits of consecutive 1s has the same size as at the time of a mark ratio of 50% as shown in FIG. 3. As a result, the ASE component is prevented from increasing in the part of 72 bits of consecutive 1s as shown in FIG. 4, so that it is possible to prevent a variation in signal gain.

According to this embodiment, the single circuit of the gain control response speed determination part 148 in the end station 51 is satisfactory, and it is possible to delete a gain control response speed determination part from each of the optical amplifiers $53_1$ through $53_n$. In this embodiment, the gain control response speed determination part 148 is installed in the end station 51. However, the location of its installation is not limited to that of this embodiment, and the gain control response speed determination part 148 may be installed in the end station 52.

Thus, it is possible to provide a WDM optical transmission system capable of supporting both a fast increase and decrease in the number of wavelengths and a low-speed signal with a small number of wavelengths.

The monitoring signal input parts 47 and 147 and the gain control response speed determination parts 48 and 148 correspond to a response speed switching part.

The present invention is not limited to the specifically disclosed embodiments, and variations and modifications may be made without departing from the scope of the present invention.

The present application is based on Japanese Priority Patent Application No. 2005-273142, filed on Sep. 21, 2005, the entire contents of which are hereby incorporated by reference.

What is claimed is:

1. An optical amplifier, comprising:
   an input monitoring part configured to monitor an input wavelength division multiplexed light;
   an amplification part configured to amplify and output the input wavelength division multiplexed light;
   an output monitoring part configured to monitor the wavelength division multiplexed light output from the amplification part;
   a gain control part configured to perform automatic gain control so that a ratio of output light intensity monitored by the output monitoring part to input light intensity monitored by the input monitoring part is constant; and
   a response speed switching part configured to switch a response speed of the automatic gain control between a first speed and a second speed that is different from the first speed.

2. The optical amplifier as claimed in claim 1, wherein the response speed switching part switches the response speed of the automatic gain control based on a number of wavelengths of the input wavelength division multiplexed light and signal rate information of each of the wavelengths, the number of the wavelengths and the signal rate information being fed externally.

3. The optical amplifier as claimed in claim 2, wherein the response speed switching part switches the response speed of the automatic gain control by switching a response speed of each of the input monitoring part and the output monitoring part.

4. The optical amplifier as claimed in claim 2, wherein the response speed switching part switches the response speed of the automatic gain control by switching a response speed of the gain control part.

5. The optical amplifier as claimed in claim 1, wherein the response speed switching part is fed externally with a response speed switching signal based on a number of wavelengths of the input wavelength division multiplexed light and signal rate information of each of the wavelengths.

6. The optical amplifier as claimed in claim 5, wherein the response speed switching part switches the response speed of the automatic gain control by switching a response speed of each of the input monitoring part and the output monitoring part.

7. The optical amplifier as claimed in claim 5, wherein the response speed switching part switches the response speed of the automatic gain control by switching a response speed of the gain control part.

* * * * *